US012094076B2

(12) United States Patent
Yoon et al.

(10) Patent No.: US 12,094,076 B2
(45) Date of Patent: Sep. 17, 2024

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Junkeun Yoon, Suwon-si (KR); Kideok Kim, Suwon-si (KR); Minsoo Kim, Suwon-si (KR); Jeonghyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 17/451,790

(22) Filed: Oct. 21, 2021

(65) Prior Publication Data

US 2022/0122218 A1   Apr. 21, 2022

Related U.S. Application Data

(63) Continuation of application No. PCT/KR2021/011018, filed on Aug. 19, 2021.

(30) Foreign Application Priority Data

Oct. 21, 2020   (KR) .................. 10-2020-0137105

(51) Int. Cl.
*G06T 3/40* (2024.01)
*G06T 7/12* (2017.01)

(52) U.S. Cl.
CPC .............. *G06T 3/40* (2013.01); *G06T 7/12* (2017.01); *G06T 2207/10024* (2013.01); *G06T 2207/20021* (2013.01); *G06T 2207/20221* (2013.01)

(58) Field of Classification Search
CPC ... G06T 3/40; G06T 7/12; G06T 2207/10024; G06T 2207/20021; G06T 2207/20104; G06T 2207/20221
See application file for complete search history.

(56) References Cited

U.S. PATENT DOCUMENTS 7,876,477 B2   1/2011   Toma et al.
7,920,755 B2   4/2011   Neal
(Continued)

FOREIGN PATENT DOCUMENTS

CN   107220600 A   9/2017
CN   111340720 A   6/2020
(Continued)

OTHER PUBLICATIONS

Wang et al., "Biggerpicture: data-driven image extrapolation using graph matching", ACM Transactions on Graphics, 2014, 14 pages.
(Continued)

*Primary Examiner* — Daniel G Mariam

(57) ABSTRACT

An electronic device and a controlling method of the electronic device is disclosed. Specifically, the electronic device according to the disclosure may identify, based on receiving a user input for expanding an outer area of a first image, a plurality of objects included in the first image, and obtain a first segmentation image including segmentation information on areas corresponding to the respective objects, obtain a second segmentation image in which an outer area of the first segmentation image is expanded based on the segmentation information, obtain a second image in which segmentation information included in the second segmentation image is converted to RGB information, obtain a third image by reflecting a feature of the first image to the second image based on the segmentation information, and provide the obtained third image.

18 Claims, 11 Drawing Sheets

(56) References Cited

U.S. PATENT DOCUMENTS

| | | |
|---|---|---|
| 8,233,712 B2 | 7/2012 | Maxwell et al. |
| 8,260,048 B2 | 9/2012 | Jin |
| 8,441,524 B2 | 5/2013 | Yahagi |
| 10,297,009 B2 | 5/2019 | Urban et al. |
| 10,540,757 B1 | 1/2020 | Bouhnik et al. |
| 2007/0297669 A1 | 12/2007 | Neal |
| 2014/0320534 A1 | 10/2014 | Kimura |
| 2017/0365037 A1 | 12/2017 | Urban et al. |
| 2018/0137623 A1* | 5/2018 | Stålring .................. G06T 7/11 |
| 2021/0084372 A1 | 3/2021 | Seo et al. |
| 2022/0375099 A1* | 11/2022 | Schulz .................. G06T 7/0012 |

FOREIGN PATENT DOCUMENTS

| | | |
|---|---|---|
| KR | 10-2007-0122409 A | 12/2007 |
| KR | 10-1554421 B1 | 9/2015 |
| KR | 10-2017-0097745 A | 8/2017 |
| KR | 10-2019-0088406 A | 7/2019 |
| KR | 10-2084682 B1 | 3/2020 |

OTHER PUBLICATIONS

Li et al., "Controllable and Progressive Image Extrapolation", 2021, 10 pages.
International Search Report and Written Opinion of the International Searching Authority dated Nov. 29, 2021, in connection with International Application No. PCT/KR2021/011018, 14 pages.
Seifi, et al., "Attend and Segment: Attention Guided Active Semantic Segmentation," arXiv:2007.11548 [cs.CV], Jul. 2020, 18 pages.
Wang, et al., "Wide-Context Semantic Image Extrapolation," IEEE Computer Society, 2019, 10 pages.
"Comparison of Image features (SIFT, HOG, Haar, Ferns, LBP, MCT)" by Dark Programmer, Jan. 9, 2014, 16 pages.

* cited by examiner

ELECTRONIC DEVICE AND CONTROLLING METHOD OF ELECTRONIC DEVICE

CROSS-REFERENCE TO RELATED APPLICATIONS

This application is a bypass continuation of International Application No. PCT/KR2021/011018, filed on Aug. 19, 2021, which claims priority to Korean Patent Application No. 10-2020-0137105, filed on Oct. 21, 2020, in the Korean Intellectual Property Office, the disclosures of which are incorporated by reference herein in their entirety.

BACKGROUND

1. Field

The disclosure relates to an electronic device and a controlling method of the electronic device. More particularly, the disclosure relates to an electronic device capable of expanding an outer area of an original image and a controlling method of the electronic device.

2. Description of the Related Art an object included in an image to be more stable, technology for generating a new image by naturally expanding an outer area of the original image is under development.

However, if an outer area of the original image is expanded through the method of copying a patch that corresponds to a part of an area of the original image and pasting to an outer area according to the related art, there may be a problem of an unnatural object introduced in the outer area.

Meanwhile, when the outer area of the original image is expanded with the method of analyzing pixels of the original image, predicting the image to be arranged in the outer area, and drawing the predicted image according to the related art, problems such as data for prediction becoming obscure as the outer area extends furthers from the area of the original image, which may generate blurring in the outer area of image.

In particular, because the outer area of the original image is expanded without taking into consideration properties of the plurality of objects included in the original image and information on a context of the image according thereto according to the related art, the information included in the expanded outer area may not transition naturally with the information included in the original image.

Accordingly, there is a growing need for technology capable of providing an image that coincides with an intent of a user by naturally expanding the outer area of the original image.

SUMMARY

Aspects of the disclosure are to address at least the above-mentioned problems and/or disadvantages and to provide at least the advantages described below. Accordingly, an aspect of the disclosure is to provide an electronic device capable of obtaining an image in which an outer area of an original image is expanded naturally and a controlling method of the electronic device.

According to various embodiments, an electronic device includes a memory configured to store at least one instruction and a processor configured to execute the at least one instruction, and the processor, based on executing the at least one instruction, is configured to identify, based on receiving a user input for expanding an outer area of a first image, a plurality of objects included in the first image, and obtain a first segmentation image including segmentation information on areas corresponding to the respective objects, obtain a second segmentation image in which an outer area of the first segmentation image is expanded based on the segmentation information, obtain a second image in which segmentation information included in the second segmentation image is converted to RGB information, obtain a third image by reflecting a feature of the first image to the second image based on the segmentation information, and provide the obtained third image.

According to various embodiments, a controlling method of an electronic device includes identifying, based on receiving a user input for expanding an outer area of a first image, a plurality of objects included in the first image and obtaining a first segmentation image including segmentation information on areas corresponding to the respective objects, obtaining a second segmentation image in which an outer area of the first segmentation image is expanded based on the segmentation information, obtaining a second image in which segmentation information included in the second segmentation image is converted to RGB information, obtaining a third image by reflecting a feature of the first image to the second image based on the segmentation information, and providing the obtained third image.

According to various embodiments, a non-transitory computer readable medium including a program executing a controlling method of an electronic device includes identifying, based on receiving a user input for expanding an outer area of a first image, a plurality of objects included in the first image and obtaining a first segmentation image including segmentation information on areas corresponding to the respective objects, obtaining a second segmentation image in which an outer area of the first segmentation image is expanded based on the segmentation information, obtaining a second image in which segmentation information included in the second segmentation image is converted to RGB information, obtaining a third image by reflecting a feature of the first image to the second image based on the segmentation information, and providing the obtained third image

DETAILED DESCRIPTION

Figure 1:
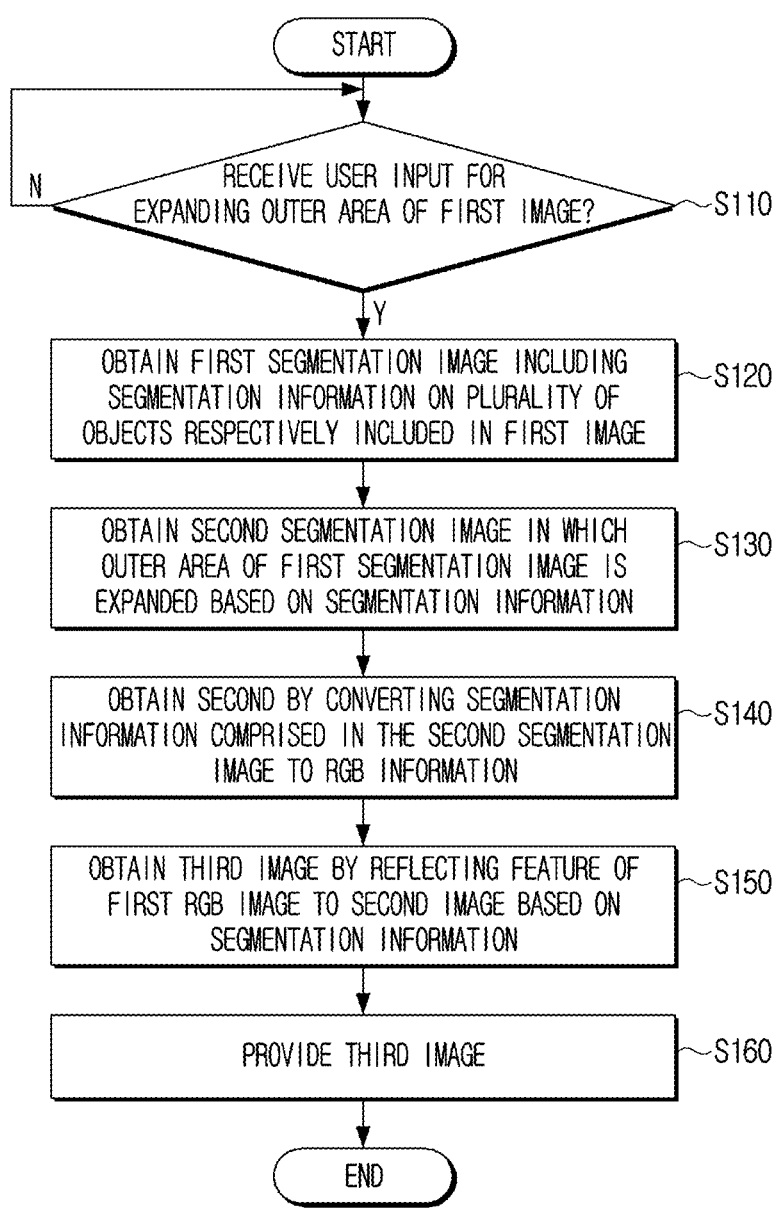
FIG. 1 is a flowchart illustrating a controlling method of an electronic device according to an embodiment.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. With respect to the description on the drawings, like reference numerals may be used to indicate like elements.

In describing the disclosure, description of related known technologies that may unnecessarily confuse the gist of the disclosure will be omitted.

Further, the embodiments described below may be modified to various different forms, and the scope of technical spirit of the disclosure is not limited to the embodiments described below. Rather, the embodiments are provided to augment the disclosure, and to enable those of ordinary skill in the technical field to which the disclosure pertains to fully understand the scope.

Terms used herein are used merely to describe a specific embodiment, and not to limit the scope. A singular expression includes a plural expression, unless otherwise specified.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The terms "module" or "part" used in the embodiments herein perform at least one function or operation, and may be implemented with a hardware or software, or a combination of hardware and software. Further, a plurality of "modules" or a plurality of "parts", except for a "module" or a "part" which needs to be implemented to a specific hardware, may be integrated to at least one module and implemented in at least one processor.

Various elements and areas in the drawings have been schematically illustrated. Accordingly, the technical spirit of the disclosure is not limited by the relative dimensions or distances illustrated in the accompanied drawings.

An electronic device in accordance with various embodiments of the disclosure may include at least one from among, for example, and without limitation, a smartphone, a tablet personal computer (PC), a desktop PC, a laptop PC, or a wearable device. The wearable device may include at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a skin-attached type (e.g., a skin pad or a tattoo), or a bio-implantable circuit.

In some embodiments, the electronic device may include at least one from among, for example, and without limitation, a television, a digital video disk (DVD) player, an audio, a refrigerator, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

In another embodiment, the electronic device may include at least one from among various medical devices (e.g., various portable medical measurement devices (glucose measuring device, a heart rate measuring device, a blood pressure measuring device, a temperature measuring device, etc.), a magnetic resonance angiography (MRA), a magnetic resonance imaging (MRI), a computed tomography (CT), an imaging apparatus, an ultrasonic device, etc.), a navigation device, a global navigation satellite system (GNSS), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial or personal robot, a drone, an automated teller machine (ATM) of financial institutions, a point of sales (POS) of shops, or an internet of things device (e.g., light bulbs, various sensors, sprinkler devices, fire alarms, temperature adjusters, street lights, toasters, exercise equipment, hot water tanks, heater, boilers, etc.).

Embodiments of the disclosure will be described in detail with reference to the accompanying drawings to aid in the understanding of those of ordinary skill in the art.

Figure 2:
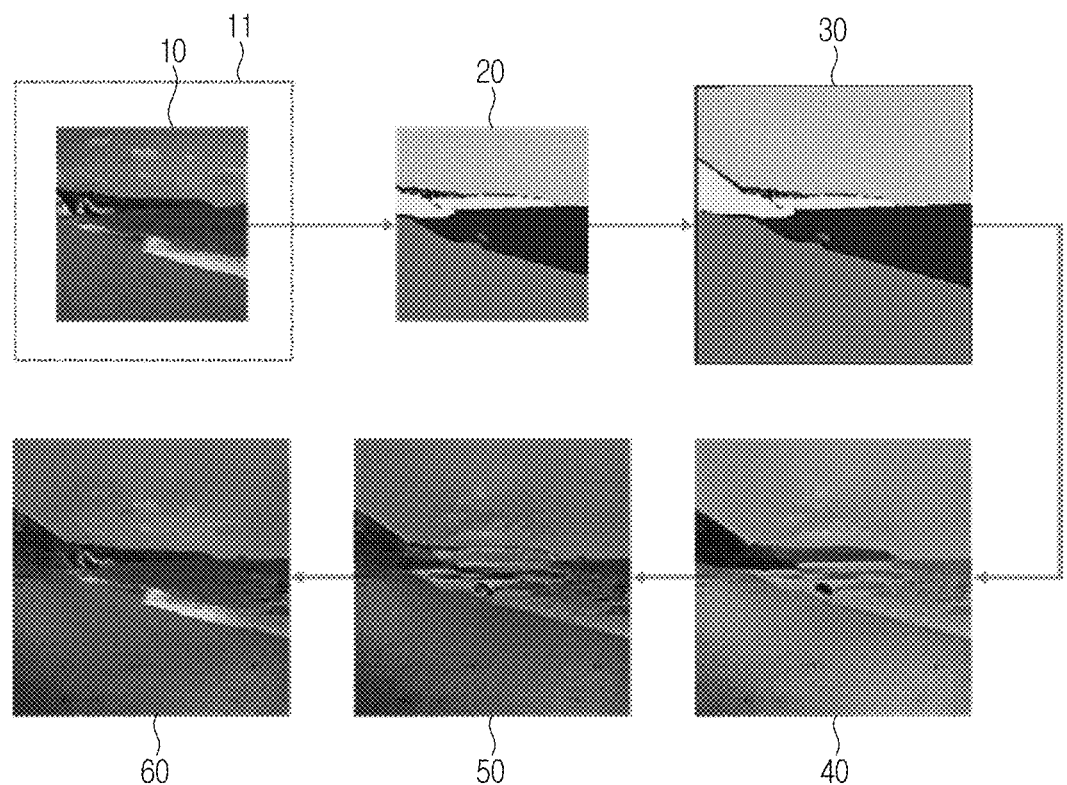
FIG. 2 is a diagram illustrating images obtained sequentially according to respective steps of the controlling method of FIG. 1 according to various embodiments of the present disclosure.

FIG. 1 is a flowchart illustrating a controlling method of an electronic device according to an embodiment. Further, FIG. 2 is a diagram illustrating images obtained sequentially according to respective steps of the controlling method of FIG. 1. An embodiment of the disclosure will be described below with reference to FIG. 1 together with FIG. 2.

The 'electronic device' according to the disclosure may refer to a device capable of providing a new image by expanding an outer area of an original image. For example, the electronic device may be implemented as a user terminal such as, for example, and without limitation, a smartphone, a tablet personal computer (PC), and the like, and may be implemented as a server or a cloud system configured to expand the outer area of the image and transfer to the user terminal. However, the electronic device according to the disclosure is not limited to the above-described types.

As illustrated in FIG. 1, the electronic device may be configured to receive a user input for expanding an outer area of a first image 10 (S110).

In the disclosure, 'image' may refer to an image showing objects included in the image according to a red, green and blue (RGB) value per pixel. That is, the term 'image' may be a term for collectively referring to a common image such as an image obtained through a camera of the electronic device to differentiate with a 'segmentation image' which will be described below. For example, an image may refer an image such as a first image 10, a second image 40, a third image 60 and a fourth image 50, and among therefrom the "first image 10" may refer to an original image that does not undergo an image processing process according to the controlling method of the disclosure.

The first image 10 may be an image that may be obtained in real-time through the electronic device, an image pre-stored in the electronic device, an image received from an external device, and the like, and may refer to not only an image comprised of one frame, but also a moving image.

The "user input" may refer to a user input for expanding the outer area of the first image 10 which is the original image, and here, the "outer area" of the image may refer to a pre-set area surrounding a boundary vicinity of the image. For example, the outer area of the first image 10 may be an area from a boundary of the first image 10 to a boundary represented by a dotted line 11. In FIG. 2, the area surrounding the boundary of the first image 10 in all directions is set as the outer area has been illustrated, but the embodiment is not limited thereto. That is, the disclosure may be applied even when expanding one side surface or both side surfaces of the first image 10. The size of the outer area that is the subject of expansion may also be variously determined according to a user setting.

The user input may be received based on a user touch that is input through a display of the electronic device, a user voice that is received through a microphone of the electronic device, an input of a physical button provided in the electronic device, a control signal transmitted by a remote control device configured to control the electronic device, or the like.

In describing the disclosure, the term "expansion of an image" may refer to a process of generating a new image by applying pixels capable of naturally connecting to objects included in the original image to the outer area of the original image and not enlarging the pixels of the original image to a certain percentage. Accordingly, the term "expansion" of an image in describing the disclosure may be used interchangeably with terms such as "extension," "extrapolation," or the like.

When the user input is received, the electronic device may obtain the first segmentation image 20 including segmentation information on areas that correspond to a plurality of objects, respectively, which are included in the first image 10 (S120). Specifically, the electronic device may use the segmentation model to identify the plurality of objects included in the first image 10, and obtain the first segmentation image 20 showing the segmentation information on areas corresponding to the respective objects in colors corresponding thereto.

The "segmentation model" may refer to a neural network model trained to output by obtaining the segmentation image corresponding to an input image. For example, the segmentation model may use a one-hot encoding to set output channels on a pre-defined plurality of classes (may be referred to as category, domain, or the like), respectively, and obtain information on a class corresponding to respective pixels of the input image by passing the image input to the respective output channels. The segmentation model according to the disclosure may be in particular a "semantic segmentation model," and may include a neural network such as, for example, and without limitation, a convolutional neural network (CNN), a Unet CNN, a fully convolutional network for semantic segmentation (FCN), or the like.

The "segmentation information" may include information on a label representing which class respective pixels of the input image belong, and specifically, may include information on the types of the respective objects, the location of the respective objects, areas of the respective objects, and the like included in the input image.

The "segmentation image" may be an image including the segmentation information, and specifically, may refer to an image showing areas that correspond to the respective objects in colors corresponding to classes for the respective objects included in the image. The segmentation image may refer to an image such as the first segmentation image 20 and a second segmentation image 30 of FIG. 2, and among therefrom, the term "first segmentation image 20" may be used as a term for specifying the segmentation image output as a result of inputting the first image 10 to the segmentation model according to the disclosure. For example, the first segmentation image 20 of FIG. 2 may show the area corresponding to "sky," "sea," "land," and "mountain," which are objects included in the first segmentation image 20, respectively in colors allocated for "sky," "sea," "land," and "mountain," respectively.

To summarize, the segmentation model may, by simplifying the various information included in the first image 10 to the form of a clustering map (i.e., a segmentation map), and clarifying the boundaries of the respective objects included in the image, perform a role in clearly defining the information necessary in image expansion.

The electronic device may, by performing an "outline detection process" in addition to the segmentation process as described above, detect the boundaries of the respective objects included in the first image 10 more clearly. The embodiment in which the outline detection process is combined with the segmentation process will be described with reference to FIG. 3.

Based on obtaining the first segmentation, the electronic device may obtain the second segmentation image 30 in which the outer area of the first segmentation image 20 is expanded based on segmentation information (S130). That is, the "second segmentation image 30" may refer to a segmentation image obtained by expanding the outer area of the first segmentation image 20. As illustrated in FIG. 2, the second segmentation image 30 may be an image expanded in a form of pixels capable of naturally extending from objects included in the original image being added to an area in the boundary vicinity of the first segmentation image 20.

Specifically, according to various embodiments, the electronic device may identify an expanding property corresponding to the types of the respective objects based on information on the types of the respective objects included in the segmentation information, and expand the outer area of the first segmentation image 20 based on the identified expanding property for the respective objects.

The "expanding property" may be used as a term for collectively referring to a property on a form of an object capable of affecting the outer area of the image to naturally expand. Specifically, the expanding property may include a convergence property and a divergence property. The "expanding property" may refer to a property of an object in which forming a closed curve to complete an object form is natural when expanding an object such as "person, automobile, or smartphone," and "convergence property" may refer to a property of an object in which not forming the closed curve is natural to complete the object form when expanding an object such as "sky, sea, or mountain." The expanding property according to the disclosure is not limited to the examples described above, and may include properties including a general shape or size of an object, and the like.

Based on identifying the expanding property that corresponds to the types of the respective objects, the electronic device may expand the outer area of the first segmentation image 20 based on the expanding property for the respective objects. For example, based on identifying an emissive property that is the expanding property corresponding to "sky" arranged at the outer area of the first segmentation image 20, the electronic device may expand "sky" in the form of extending until the boundary of the second segmentation image 30. Although not illustrated in FIG. 2, if an "automobile" is arranged at the outer area of the first segmentation image 20, the electronic device may identify a convergence property that is the expanding property corresponding to the "automobile," and expand the "automobile" in the form of a closed curve corresponding to the size thereof being formed. The various embodiments associated with an expansion process of the image will be described with reference to FIG. 4.

Based on obtaining the second segmentation image 30, the electronic device may obtain the second image 40 in which the segmentation information included in the second segmentation image 30 is converted to RGB information (S140).

Specifically, the electronic device may obtain the second image 40 based on the second segmentation image 30 through an image generating model. The term 'second image 40' may be a term for differentiating the image obtained based on the second segmentation image 30 from the first image 10, which is the original image, and the third image which will be described below, and specifying the term. The second image 40 may, as illustrated in FIG. 2, have the same size as the second segmentation image 30.

The "image generating model" may refer to a neural network model trained to generate a new image corresponding to the input data. Specifically, the image generating model may be implemented with a generative adversarial network (GAN), and include a generator trained to generate an image and a discriminator trained to distinguish a plurality of images.

Specifically, the "generator" may be trained to follow the segmentation image and a distribution of learning data comprised of pairs of images corresponding thereto, and may be configured to output an image corresponding to the segmentation image input according thereto. Further, the "discriminator" may be configured to distinguish a difference between the image generated by the generator and the image of the learning data, and output feedback information on the difference.

The discriminator may be configured to obtain a probability value close to 1 the more similar the image generated by the generator is with the image of the learning data, and obtain a probability value close to 0 the less similar the image generated by the generator is with the image of the learning data. Further, the value of adding the probability value of inputting the image generated by the generator to the discriminator and the probability value of inputting the image of the learning data to the discriminator may be a loss function of the discriminator.

Further, based on updating a weight value of the discriminator in a direction minimizing the value of the loss function, a learning process of the discriminator may be performed. Specifically, the loss function value may determine a direction and size of an update by being transferred to the weight value of respective layers included in the generator and the discriminator through backpropagation. The method of optimizing weight value as described in the method above may be referred to as a gradient descent. However, the optimization method of the weight value according to the disclosure is not limited to the above-described method.

In the case of the generator, the discriminator may be trained to obtain a probability value close to 1 when inputting the image generated by the generator to the discriminator. That is, the difference between probability value of inputting the image generated by the generator to the discriminator and 1 may be the loss function of the generator, and based updating on the weight value of the generator in a direction minimizing the value of the loss function, the learning process of the generator may be performed.

As described above, the generator and the discriminator may be trained adversarial to one another, and accordingly, the generator may accurately simulate the distribution of learning data. However, even if the image generating model is trained through sufficient learning data and sufficient learning time, a difference may be present between the second image 40 generated by converting the segmentation information included in the first segmentation image 20 back to RGB information and the first image 10, which is the original image. The difference as described above may be resolved through step S150, which will be described below.

Based on obtaining the second image 40, the electronic device may obtain the third image 60 by reflecting the properties of the first image 10 to the second image 40 based on the segmentation information (S150). Here, the term "third image 60" may be used to specify an image generated by reflecting the properties of the first image 10 to the second image 40. The third image 60 may have the same size as the second image 40 as illustrated in FIG. 2.

Specifically, a process of reflecting a feature of the first image 10 to the second image 40 may include a style transfer process and an image blending process.

The "style transfer process" may refer to a process of obtaining a fourth image 50 in which a style of the first image 10 is reflected by transferring the style of the first image 10 to the second image 40. The image in which the style of the first image 10 is reflected in the second image 40 will be referred to as the "fourth image 50" below for convenience of description.

Specifically, the electronic device may obtain information on a parameter capable of affecting the style of the image from the first image 10, and by changing the parameter of the second image 40 to correspond to the information on the obtained parameter, obtain an image in which the style of the first image 10 is reflected. For example, the parameter capable of affecting the style of the image may include hue, brightness, saturation, contrast, exposure, highlight, shadow, luminance, color temperature, noise, vignette, black point, and the like, but the embodiment is not limited thereto.

In particular, the style transfer process may be performed by using the segmentation information included in the first segmentation image 20 together with the information on the parameter obtained from the first image 10. Specifically, the electronic device may identify the types of the respective objects, the locations of the respective objects, and the areas of the respective objects included in the first image 10 based on the segmentation information, and by performing the style transfer process as described above for the respective objects, reflect the style of the first image 10 more specifically to the second image 40 in object units.

The "image blending process" may refer to a process of obtaining a new image by blending the first image 10 with the fourth image 50. The image generated by blending the RGB values for the respective pixels of the first image 10 and the fourth image 50 may be referred to as a "third image 60" below.

Specifically, the electronic device may identify a blending property corresponding to the types of the respective objects based on the information on the types of the respective objects included in the segmentation information, determine an area at which the first image 10 and the fourth image 50 are to be blended based on the blending properties for the respective objects, and obtain the third image 60 by blending the RGB values for the respective pixels of the first image 10 and the RGB values for the respective pixels of the fourth image 50 that corresponds to the determined area according to a pre-determined weight value. Here, the "blending property" may include a size of an area taken up by the object within the image, an extent of a feature changing within the object, a depth to which the object is arranged within the image, and the like.

In an example, based on a non-substantial extent of the features changing within the object, such as an area corresponding to the "sea," the electronic device may blend a wide area of the first image 10 to the fourth image 50, and alternatively, based on a substantial extent of a feature changing within the object, such as a "person," the electronic device may blend a relatively narrow area of the first image 10 compared to an area corresponding to the "sea" to the fourth image 50. A more detailed embodiment on the image blending process according to the disclosure will be described with reference to FIG. 5.

Based on obtaining the third image 60 through the process as described above, the electronic device may provide the obtained third image 60 (S160). Specifically, the electronic device may display the third image 60 through the display of the electronic device, and provide the third image 60 to a user by transmitting the third image 60 to an external device through a communicator.

According to the embodiment as described above, the electronic device of the disclosure may obtain the image in which the outer area of the original image is naturally expanded based on the types of the respective objects and the properties according thereto included in the original image and provide to the user.

Figure 3:
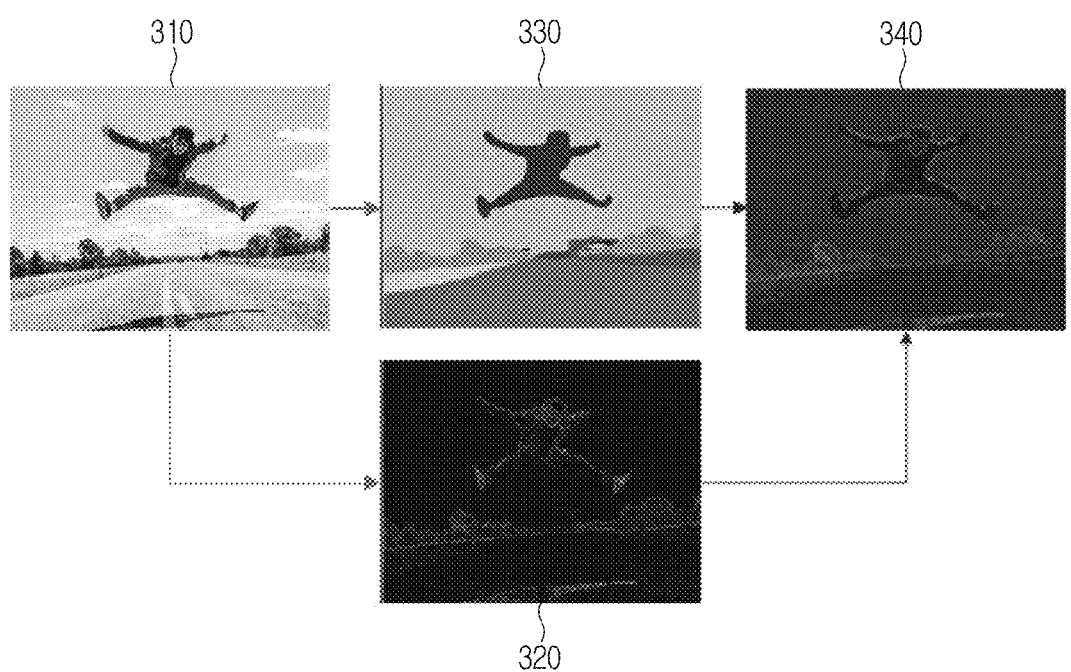
FIG. 3 is a diagram illustrating in detail an embodiment on a segmentation process according to various embodiments of the present disclosure.

FIG. 3 is a diagram illustrating in detail an embodiment on a segmentation process according to an embodiment. That is, FIG. 3 is a diagram illustrating in detail an embodiment associated with step S120 of FIG. 1.

As described above, the electronic device may obtain the first segmentation image that includes segmentation information on areas corresponding to the respective objects included in the first image 310.

However, because the segmentation process is configured to identify the class corresponding thereto for the respective pixels of the first image 310, the boundary of the object included in the first image 310 may not be clearly defined. Specifically, a segmentation image showing one object in colors corresponding to a plurality of labels through the segmentation process, or showing the plurality of objects in a color corresponding to one label may be obtained. For example, based on a vicinity of a "person" being surrounded by the "sky" as in the first image 310 as illustrated in FIG. 3, there may be a possibility that at least a portion from among the area corresponding to the "person" (including clothes worn by the person) may be recognized as the "sky" as a result of performing the segmentation process.

Accordingly, the electronic device according to the disclosure may perform the outline detection process on the first image 310, and obtain the first segmentation image in which the boundaries of the respective objects included in the first image 310 are clearly defined by using a result based on the segmentation process together with a result based on the outline detection process.

Here, an "outline" may refer to a set of a point in which the luminance of an image is changed from a low value to a high value or changed from a high value to a low value. Further, an "outline detection" may refer to a process of obtaining information on a gradient representing a luminance change rate within an image by using a mask such as a Sobel mask or a Prewitt mask, and detecting pixels corresponding to the outline based therefrom.

Specifically, the electronic device may, based on performing the outline detection process, obtain information on the outline included in the first image 310, and as illustrated in FIG. 3, obtain an image 320 showing information on the outline included in the first image 310. Then, based on obtaining the information on the outline included in the first image 310, the electronic device may identify areas of the respective objects included in the first image 310 based on the obtained information on the outline. The electronic device may obtain a first segmentation image 330 including segmentation information through the segmentation process as described above.

Based on identifying areas of the respective objects included in the first image 310, the electronic device may obtain the first segmentation image 330 by allocating classes of the respective objects identified based on the segmentation information to the areas of the respective objects identified based on information on the outline. An image 340 in FIG. 3 is an illustration of an image showing the areas of the respective objects identified based on information on the outlines included in the first image 310 in color information corresponding to the allocated classes.

According to an embodiment as described above with reference to FIG. 3, the electronic device may obtain the first segmentation image in which the boundaries of the respective objects included in the first image 310 are clearly defined by combining the outline detection process to the segmentation process.

Figure 4A:
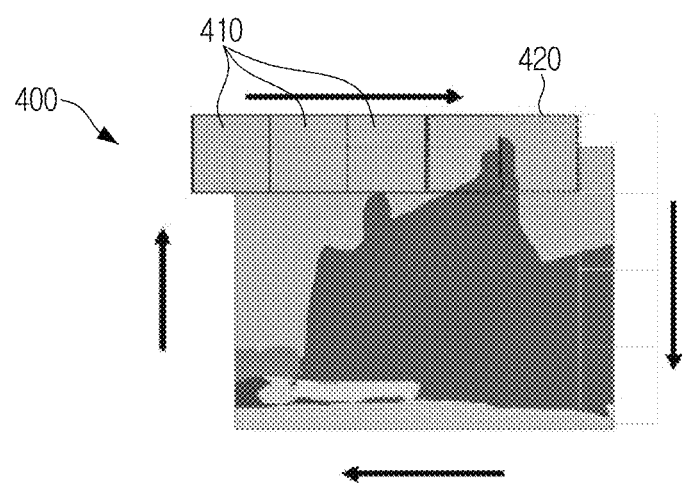
FIG. 4A and FIG. 4B are diagrams illustrating in detail an embodiment on an obtaining process of a second segmentation image according to various embodiments of the present disclosure.
Figure 4B:
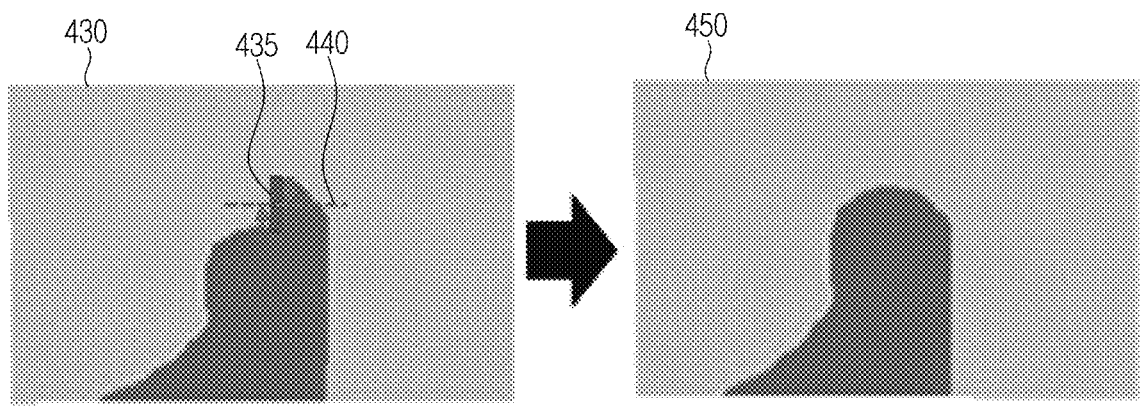

FIG. 4A and FIG. 4B are diagrams illustrating in detail an embodiment on an obtaining process of a second segmentation image according to various embodiments of the present disclosure. That is, FIG. 4A and FIG. 4B are diagrams illustrating in detail the embodiment associated with step S130 of FIG. 1.

As described above, the electronic device may obtain the second segmentation image in which the outer area of the first segmentation image 400 is expanded based on the segmentation information. In an example, the electronic device may expand the outer area of the first segmentation image 400 with a method of using a regression model based on the RGB information included in a gamut space of the image, but there may be a problem of substantial processing resources being consumed.

Accordingly, the electronic device may divide the image to patch units, and expand the outer area of the first segmentation image 400 based on the patches. For example, as illustrated in FIG. 4A, the electronic device may obtain a second segmentation image by dividing the first segmentation image 400 to a plurality of patches having a pre-set size, expanding a portion of the patches from among the plurality of patches and sequentially merging to an outer area of the first segmentation image 400. Four arrows shown in FIG. 4A circulate the outer area of the first segmentation image 400 in a clockwise direction and represent that the expanded patches 410 may be merged.

However, when merging the expanded patches 410 to the outer area of the first segmentation, a separation line may appear at a joining surface between the expanded patches 410 as with area 420 of FIG. 4A. Specifically, referring to an image 430 in FIG. 4B, which represents an enlarged area 420 of FIG. 4A, a separation line 435 may appear at the joining surface between the expanded patches 410, and accordingly, there may be the problem of the boundary of the object not connecting naturally at the joining surface between the patches 410. Accordingly, the electronic device according to an embodiment may process the patches 410 to naturally join the boundary of the object by removing the separation line that appeared at the joining surface between the patches 410.

Specifically, when the separation line appears to the joining surface between a portion of the patches 410, the electronic device may remove the separation line that appeared at the joining surface between the patches 410 by moving the location of the object on both sides of the separation line to a center point of the separation line. For example, as illustrated in the image 430 in FIG. 4B, the electronic device may move the object on the left side of the separation line 435 upwards toward the line 440 representing the center point of the separation line 435, and move the object on the right side of the separation line 435 downwards toward the line 440 representing the center point of the separation line 435. Accordingly, as illustrated in an image 450 in FIG. 4B, the separation line that appeared at the joining surface between the patches 410 may be removed.

In the above, the embodiment of removing the separation line 435 that appeared at the joining surface between the patches 410 by moving the location of the object on both sides of the separation line 435 to the center point of the separation line 435 has been described, but the location of the object on both sides of the separation line 435 may be moved to another point, which is not the center point of the separation line 435, according to the size of the object on both sides of the separation line 435. For example, based on the object left side of the separation line 435 being larger than the object right side of the separation line 435 as illustrated in FIG. 4B, the object right side of the separation line 435 may be moved further than the object on the left side of the separation line 435 and the separation line 435 that appeared at the joining surface may be removed for the naturalness of the whole second segmentation image.

According to the embodiment as described above with reference to FIGS. 4A and 4B, the electronic device may obtain the second segmentation image in which the boundary of the object is naturally joined by removing the separation line that may appear in the expansion process of the first segmentation image 400.

Figure 5:
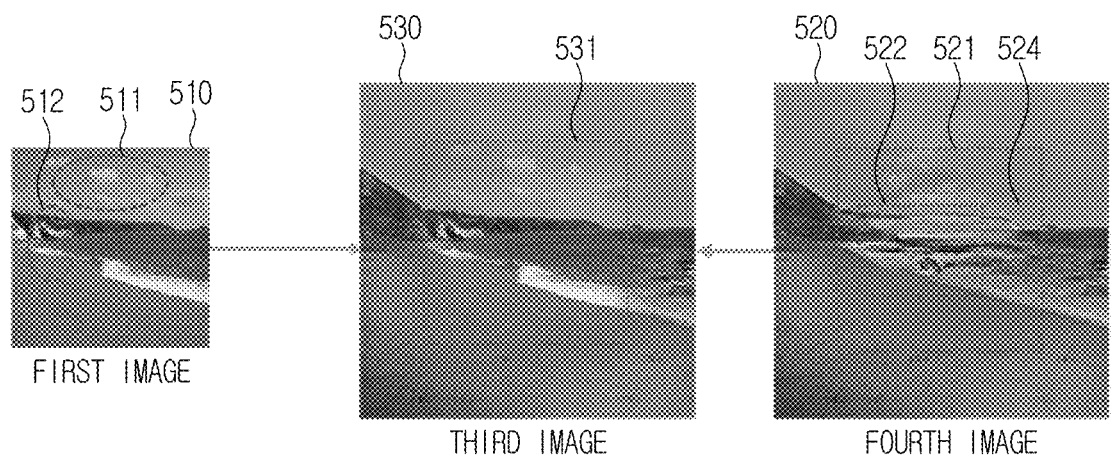
FIG. 5 is a diagram illustrating in detail an embodiment on an image blending process according to various embodiments of the present disclosure.

FIG. 5 is a diagram illustrating in detail an embodiment on an image blending process according to various embodiments of the present disclosure. That is, FIG. 5 is a diagram illustrating in detail the image blending process associated with step S150 of FIG. 1.

As described above, the electronic device may obtain a third image 530 by reflecting a feature of a first image 510 to a second image. Specifically, the electronic device may obtain a fourth image 520 in which a style of the first image 510 is reflected by transferring the style of the first image 510 to the second image through the style transfer process, and obtain the third image 530 by blending the first image 510 and the fourth image 520 through the image blending process.

In an example, examples of the first image 510 according to the embodiment, the fourth image 520 that reflects the style of the first image 510 through the style transfer process, and the third image 530 in which the first image 510 and the fourth image 520 are blended through the image blending process are illustrated in FIG. 5. Further, boundary lines 521 and 531 may, based on arranging the first image 510 to a center part of the fourth image 520 and the third image 530, show the area to which the first image 510 is arranged, respectively.

The electronic device may obtain the third image 530 by merging the first image 510 and the fourth image 520 so that the first image 510 is arranged at the center part of the fourth image 520. However, in this case, a borderline corresponding to a boundary line 531 may appear on the third image 530, or an unnatural portion may be generated before and after the boundary line 531. Accordingly, the electronic device may obtain the third image 530 by blending the RGB values for respective pixels of the first image 510 and the RGB values for respective pixels of the fourth image 520 that corresponds to a portion of an area inside a boundary line 521.

In particular, the electronic device according to the disclosure may identify the blending property corresponding to the types of the respective objects based on the information on the types of the respective objects included in the segmentation information, determine an area at which the first image 510 and the fourth image 520 are to be blended based on the blending properties for the respective objects, and obtain the third image 530 by blending the RGB values for the respective pixels of the first image 510 and the RGB values for the respective pixels of the fourth image 520 corresponding to the determined area according to a predetermined weight value. As described above, the "blending property" may include the size of the area taken up by the object within the image, the extent of the feature changing within the object, the depth to which the object is arranged within the image, and the like.

Specifically, based on the area taken up in the first image 510 and the fourth image 520 being wide and a nonsubstantial extent of the feature changing within the object as in an area 511 corresponding to a "sky" in FIG. 5, the electronic device may blend the wide area of the first image 510 to the fourth image 520, and as with an area 512 corresponding to a "cliff" in FIG. 5, based on the area taken up in the first image 510 and the fourth image 520 being relatively narrow compared to the area 511 corresponding to the "sky" and a substantial extent of the feature changing with in the object, the electronic device may blend the relatively narrow area of the first image 510 compared with the area 511 corresponding to the "sky" to the fourth image 520. Although not specifically illustrated in FIG. 5, even in areas corresponding to a "sea" and a "land" in FIG. 5, the wide area of the first image 510 may be blended with the fourth image 520 as with the area 511 corresponding to the "sky." An area 524 between the boundary line 521 and a boundary line 522 in FIG. 5 may represent a blended area in which the RGB values for respective pixels of the first image 510 and the fourth image 520 are blended. Specifically, a width of the area corresponding to the "sky" being wide and a width of the area corresponding to the "cliff" being narrow from among the area 524 represents a result according to the above-described example.

According to the embodiment as described above with reference to FIG. 5, the electronic device may obtain an image in which the outer area of the original image is more naturally expanded by performing the image blending process based on the types of the respective objects and the features according thereto included in the original image.

Figure 6:
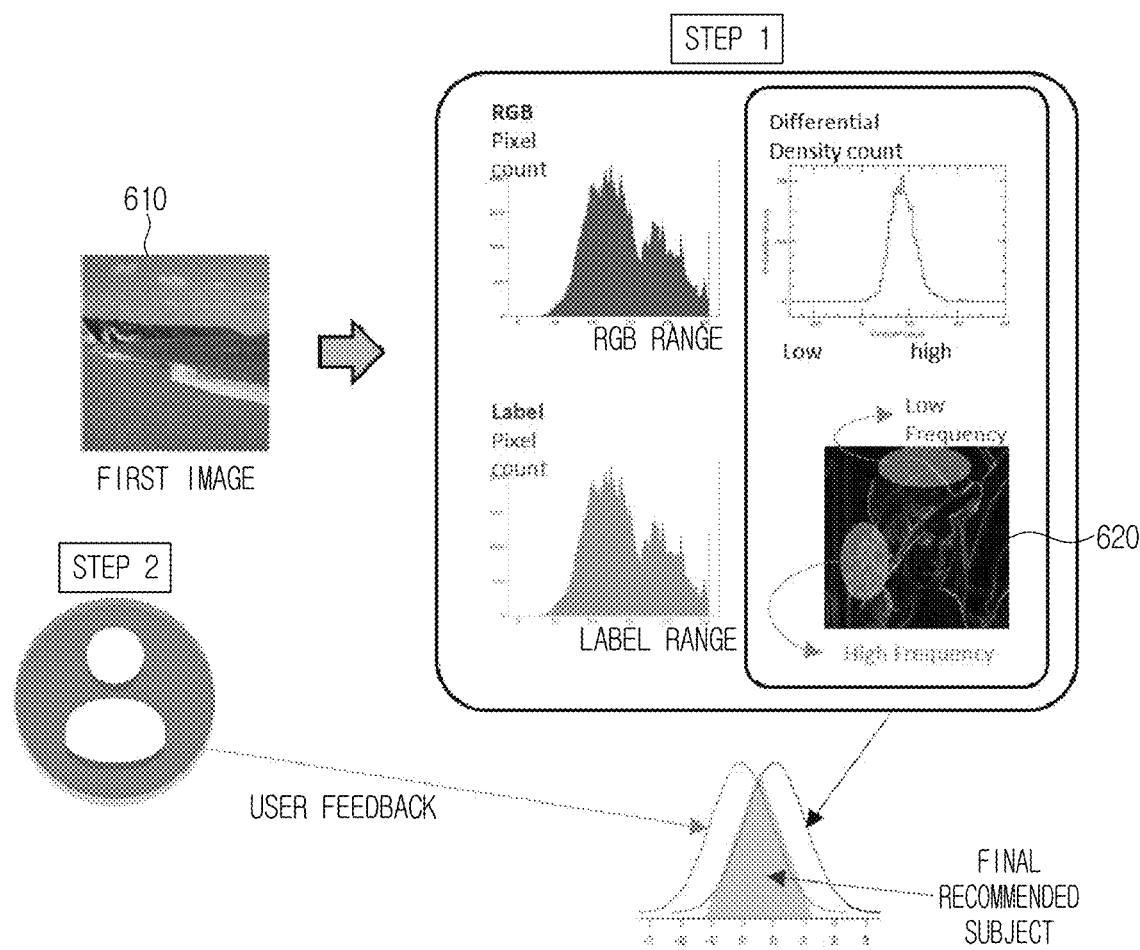
FIG. 6 is a diagram illustrating an embodiment on a method of providing an expected result on an expansion of an outer area according to various embodiments of the present disclosure.
Figure 7A:
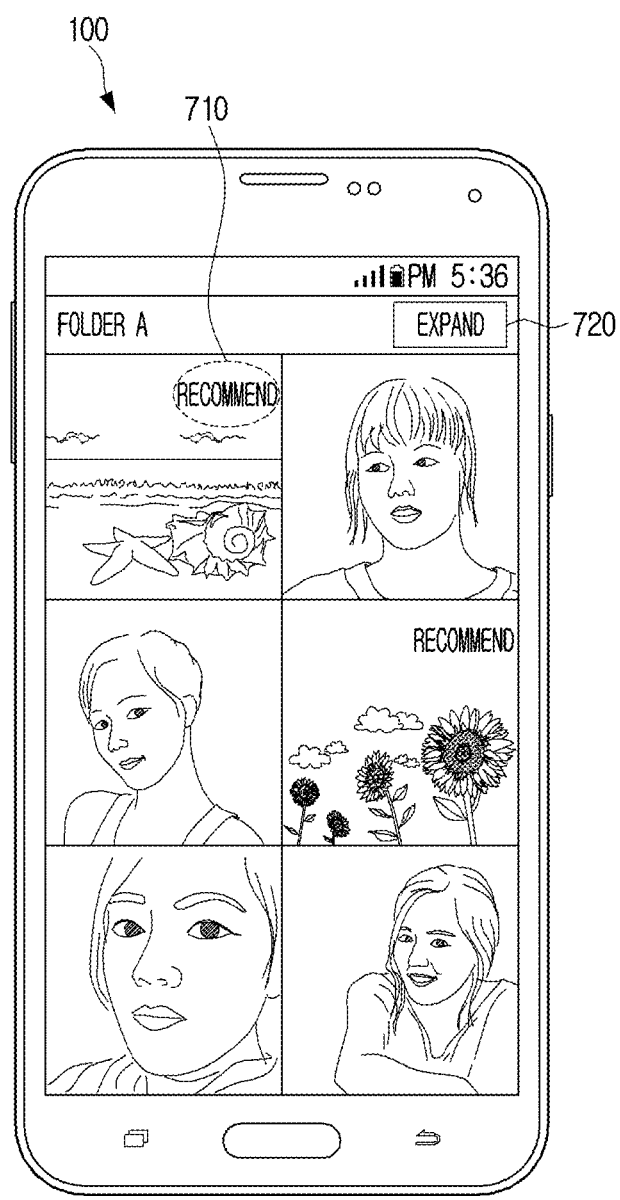
FIG. 7A and FIG. 7B are diagrams illustrating a user interface for providing an expected result on an expansion of an outer area according to various embodiments of the present disclosure.
Figure 7B:
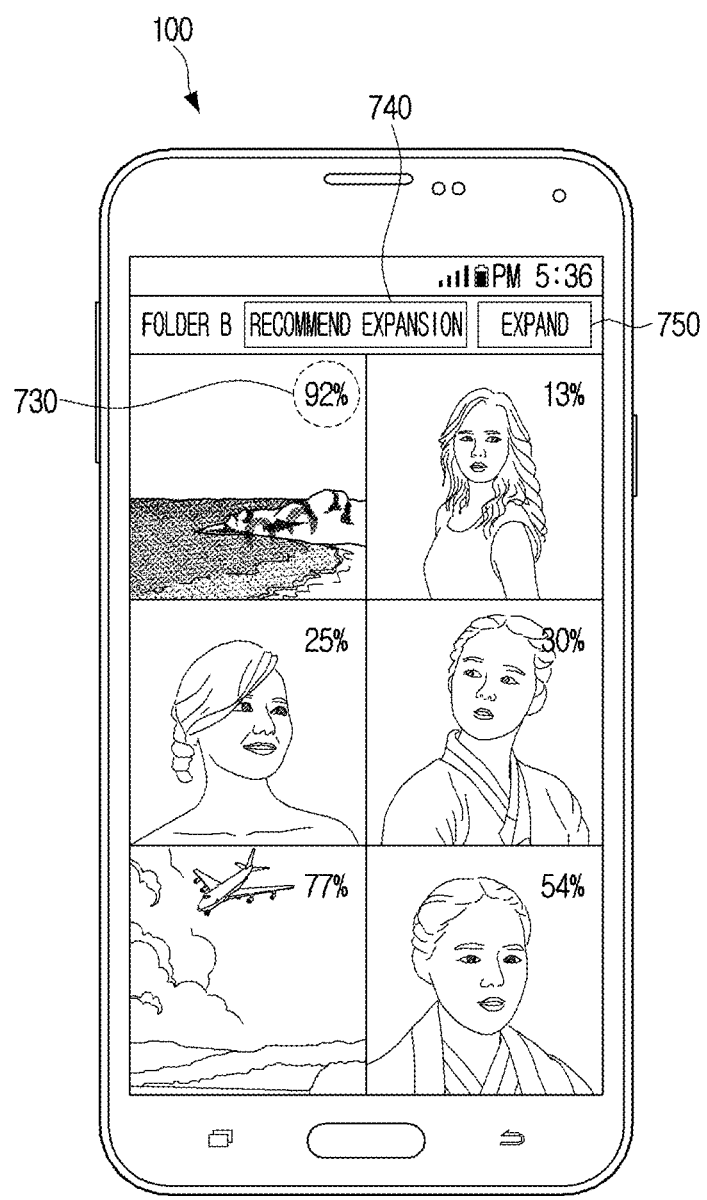

FIG. 6 is a diagram illustrating an embodiment on a method of providing an expected result on an expansion of an outer area according to an embodiment. Further, FIG. 7A and FIG. 7B are diagrams illustrating a user interface on an electronic device 100 for providing an expected result on an expansion of an outer area according to an embodiment.

Even if an image in which the outer area of the original image is expanded is obtained through the above-described embodiments, there may be a difference in the extent to which the expansion of the outer area is natural according to a feature of the original image including the type of the object included in the original image, a resolution of the original image, and the like. Accordingly, prior to receiving the user input for expanding the outer area of the original image, there is a need to provide the user with an expected result on the naturalness of expanding the outer area of the image for the respective original images.

According to an embodiment, the electronic device 100 may compare filter information on an image with the distribution of a pre-stored first assessment data and provide an expected result on the expansion of the outer area. Here, the "filter information" may be a term for collectively referring to information on a feature of an image that may be obtained with processing in small amounts such as a RGB range of an original image, a relationship between adjacent labels according to segmentation information, a differential density, a frequency distribution, and the like. Further, the "first assessment data" may refer to data in which filter information of original images is built as a data form by analyzing the original of images that have been assessed to have natural expansion of their outer areas by a developer.

For example, as illustrated in FIG. 6, the electronic device 100 may obtain information on a RGB range representing a distribution of RGB values for respective pixels of the original image 610 and a label range representing a distribution of labels for the respective pixels of the original image as filter information on the original image of which the expansion of the outer area has been assessed as naturally occurring by the developer. In addition, the electronic device 100 may obtain information on the differential density of the original image, and as illustrated in an image 620 in FIG. 6, obtain information on the frequency distribution on a high frequency area included in the original image and the frequency distribution on a low frequency area. Based on obtaining filter information on multiple original images in the same method, the electronic device 100 may obtain, based on the filter information on the multiple original images, the distribution of filter information on the image in which the expansion of the outer area is expected to naturally occur.

After the first assessment data is obtained, the electronic device 100 may obtain assessment information associated with an extent to which the filter information on the respective images stored in the electronic device 100 coincides with the first assessment data, and provide the obtained assessment information to the user as the expected result on the expansion of the outer area. In other words, the electronic device 100 may compare the filter information on the respective images with the filter information of the images in which the expansion of the outer area is assessed as natural, and provide assessment information on the naturalness of expanding the outer area expansion of the respective images. Here, the "assessment information" may be score information or percentage information representing the extent to which the filter information on the respective images coincides with the first assessment data.

For example, as illustrated in FIG. 7A and FIG. 7B, the assessment information on the respective images may be provided through an application (e.g., gallery app) for displaying the plurality of images stored in the electronic device 100. Specifically, as illustrated in FIG. 7A, the electronic device 100 may display a user interface (UI) item such as "recommend" 710 at a right upper end of the images with which the extent of the filter information from among the plurality of images coinciding with the pre-stored first assessment data is high. In addition, as illustrated in FIG. 7B, the electronic device 100 may display the UI item showing percentage information 730 associated with the extent to which the filter information coincides with the first assessment data at the right upper end of the respective images.

The provision of assessment information may be performed according to the user input of selecting a UI item such as "recommend expansion" 740 in FIG. 7B. Further, when the assessment information on the respective images is provided, the user may select at least one image for expanding the outer area and then obtain the image in which the outer area is expanded according to the disclosure by selecting the UI item such as "expand" 720 and 750 in FIG. 7A or FIG. 7B.

Even if the expected result on the expansion of the outer area is provided based on the pre-stored assessment data as described above, the assessment on whether the expansion of the outer area is natural may vary according to subjectivity of the individual user. Accordingly, the electronic device according to the disclosure may provide the expected result on the expansion of the outer area based on the feedback information of the user.

Specifically, based on the expected result on the expansion of the outer area being provided based on the filter information on the respective images, the user may input the user feedback on the at least one image from among the plurality of images. Here, the user feedback may include a positive feedback and a negative feedback. Further, based on receiving an input of the user feedback on the at least one image from among the plurality of images, the electronic device 100 may obtain the second assessment data based on the filter information on the images in which positive feedback is input. Here, the "second assessment data" may refer to data in which filter information of original images is built as a data form by analyzing the original of images that have been assessed to have natural expansion of their outer areas by the user. That is, the second assessment data may be distinguished from the first assessment data that is data constructed by the assessment of the developer.

Based on constructing the second assessment data based on the user feedback, the electronic device may obtain the assessment information associated with the extent to which the filter information on the respective images coincides with the first assessment data and the second assessment data, and provide the obtained assessment information as the expected result on the expansion of the outer area to the user. "Step 1" and "step 2" of FIG. 6 represent a process of constructing the first assessment data based on the original image of which the expansion of the outer area has been assessed as naturally occurring by the developer and a process of constructing the second assessment data based on the user feedback, respectively. Further, "final recommended subject" at the lower end in FIG. 6 may represent that images corresponding to an intersection of one graph from among the graphs representing the distribution according to the first assessment data and one graph from among the graphs representing the distribution according to the second assessment data may be recommended to the user.

According to various embodiments as described above with reference to FIG. 6 to FIG. 7A, the electronic device may facilitate user convenience and minimize unnecessary processing processes by providing the user with the expected result on the naturalness of expanding the outer area of the image for the respective original images.

Figure 8:
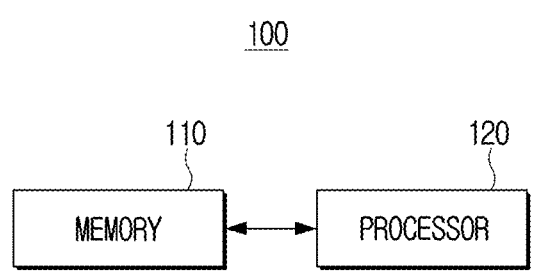
FIG. 8 is a block diagram illustrating in brief a configuration of an electronic device according to various embodiments of the present disclosure.
Figure 9:
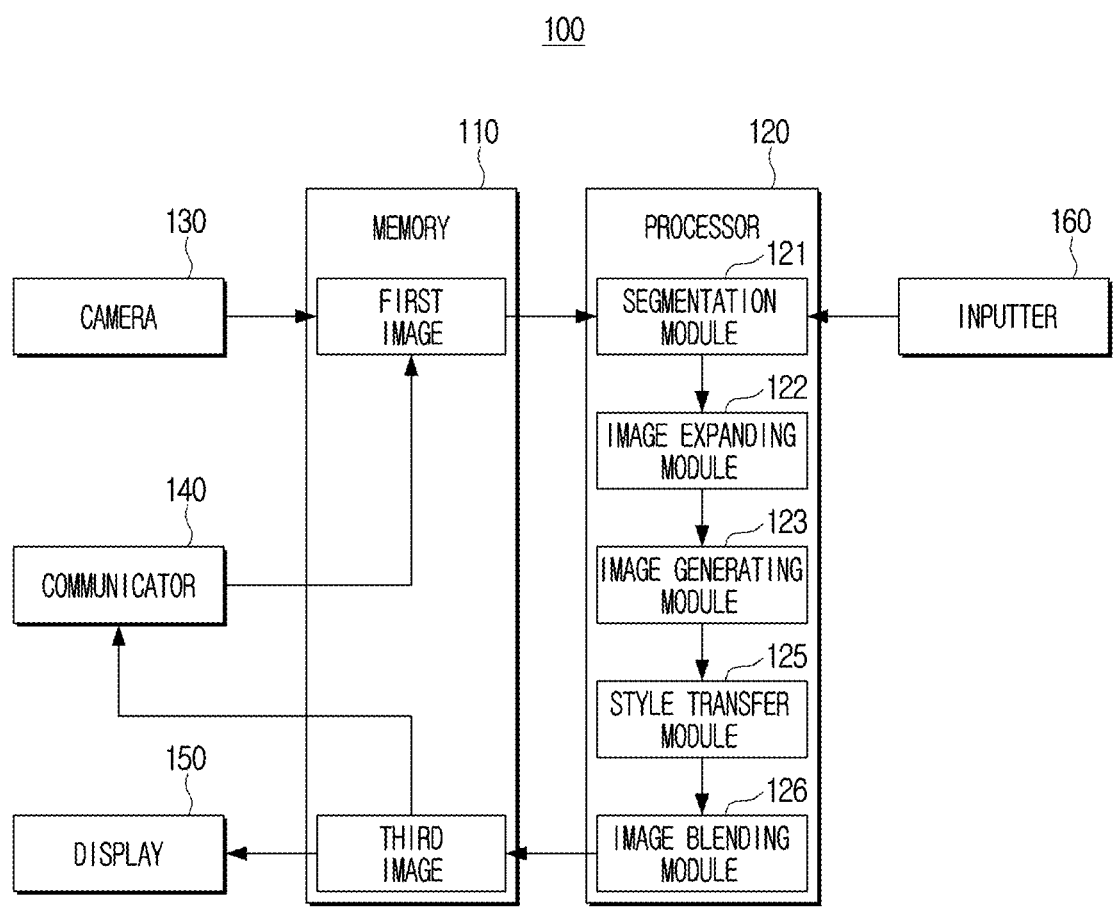
FIG. 9 is a block diagram illustrating in detail a configuration of an electronic device according to various embodiments of the present disclosure.

FIG. 8 is a block diagram illustrating in brief a configuration of the electronic device 100 according to various embodiments of the present disclosure, and FIG. 9 is a block diagram illustrating in detail a configuration of the electronic device 100 according to various embodiments of the present disclosure.

As illustrated in FIG. 8, the electronic device 100 according to an embodiment may include a memory 110 and a processor 120. In addition, as illustrated in FIG. 9, the electronic device 100 according to an embodiment may further include a camera 130, a communicator 140, a display 150, and an inputter 160. The processor 120 according to the disclosure may include a software module such as a segmentation module 121, an image expanding module 122, an image generating module 123, a style transfer module 125, and an image blending module 126. However, the configurations as illustrated in FIG. 8 and FIG. 9 are merely exemplary, and a new configuration may be added or some configurations may be omitted to the configurations as illustrated in FIG. 8 and FIG. 9 in implementing the disclosure.

The memory 110 may be configured to store at least one instruction associated with the electronic device 100. Further, the memory 110 may be configured to store an operating system (O/S) for operating the electronic device 100. In addition, the memory 110 may be configured to store various software programs or applications for operating the electronic device 100 according to the various embodiments. Further, the memory 110 may include a semiconductor memory 110 such as a flash memory 110, a magnetic storage medium such as a hard disk, or the like.

Specifically, the memory 110 may be configured to store various software module for operating the electronic device 100 according to the various embodiments, and the processor 120 may be configured to control the operation of the electronic device 100 by executing various software models stored in the memory 110. That is, the memory 110 may be accessed by the processor 120 and reading/writing/modifying/deleting/updating of data by the processor 120 may be performed.

In the disclosure, the term memory 110 may be used as including the memory 110, a read only memory (ROM; not shown) in the processor 120, a random access memory (RAM; not shown), or a memory card (not shown; e.g., a micro SD card, a memory stick) mounted to the electronic device 100.

Specifically, according to the various embodiments of the disclosure, the memory 110 may be stored with images such as, for example, and without limitation, the first image, the second image, the third image, the fourth image, the first segmentation image, the second segmentation image, and the like. The first image and the third image shown in the memory 110 of FIG. 9 merely show a portion of the images from among the images that may be stored in the memory 110. In addition, the memory 110 may be stored with the first assessment data and the second assessment data according to the disclosure, and various data associated with the plurality of modules and the neural network model according to the disclosure may be stored.

In addition thereto, various information necessary in achieving the object of the disclosure within the scope may be stored in the memory 110, and the information stored in the memory 110 may be updated according to information received from the server or the external device, or input by the user.

The processor 120 may be configured to control the overall operation of the electronic device 100. Specifically, the processor 120 may be coupled to the configurations of the electronic device 100 as described above, and control the overall operation of the electronic device 100 by executing the at least one instruction stored in the memory 110 as described above.

The processor 120 may be implemented in various methods. For example, the processor 120 may be implemented as at least one from among an application specific integrated circuit (ASIC), an embedded processor, a microprocessor, a hardware control logic, a hardware finite state machine (FSM), and a digital signal processor (DSP). In the disclosure, the term processor 120 may be used as including a central processing unit (CPU), a graphic processing unit (GPU), a main processing unit (MPU), and the like.

Specifically, according to the various embodiments of the disclosure, the processor 120 may be configured to identify, based on receiving the user input for expanding the outer area of the first image, the plurality of objects included in the first image, obtain the first segmentation image including the segmentation information on areas corresponding to the respective objects, obtain the second segmentation image in which the outer area of the first segmentation image is expanded based on the segmentation information, obtain the second image in which the segmentation information included in the second segmentation image is converted to RGB information, obtain the third image by reflecting the feature of the first image to the second image based on the segmentation information, and provide the obtained third image.

As illustrated in FIG. 9, the processor 120 may include a software module such as the segmentation module 121, the image expanding module 122, the image generating module 123, the style transfer module 125, and the image blending module 126.

The segmentation module 121 may refer to a module that obtains a segmentation image corresponding to an input image. That is, the segmentation module 121 may be a module that performs the segmentation process as described above, and may include the 'semantic segmentation model' as described above. Specifically, based on receiving the first image, the segmentation module 121 may obtain the first segmentation image and transmit to the image expanding module 122.

The image expanding module 122 may refer to a module that outputs by expanding an outer area of an input image. That is, the image expanding module 122 may refer to a module that performs the expansion process of the outer area as described above. Specifically, based on receiving the first segmentation image, the image expanding module 122 may be configured to obtain the second segmentation image in which the outer area of the first segmentation image is expanded and transmit to the image generating module 123.

The image generating module 123 may refer to a module that generates a new image corresponding to an input image. That is, the image generating module 123 may be a module that performs the generating process of the second image as described above, and may be implemented with the generative adversarial network (GAN) as described above. Specifically, based on receiving the second segmentation image, the image generating module 123 may be configured to generate the second image in which the segmentation information included in the second segmentation image is converted to RGB information, and transmit the generated second image to the style transfer module 125. [ 책살버 ]

The style transfer module 125 may refer to a module that transfers a style of the first image to the second image. That is, the style transfer module 125 may refer to a module that performs the style transfer process as described above. Specifically, the style transfer module 125 may be configured to receive the first image and the second image, obtain information on a parameter capable of affecting the style of the image from the first image, and obtain the fourth image in which the style of the first image is reflected by changing the parameter of the second image to correspond to the information on the obtained parameter, and transmit to the image blending module 126.

The image blending module 126 may refer to a module that obtains a new image by blending the first image and the fourth image. That is, the image blending module 126 may refer to a module that performs the image blending process as described above. Specifically, the image blending module 126 may be configured to determine the area at which the first image and the fourth image are to be blended based on the segmentation information, and obtain the third image by blending the RGB values for the respective pixels of the first image and the RGB values for the respective pixels of the fourth image corresponding to the determined area according to the pre-determined weight value.

At least some of the modules from among the modules as described above may be implemented through not only the neural network model, but also with a computer vision technology that does not use the neural network model, and may be implemented with a module that is included in the processor 120 in an on-chip form. Because the various other embodiments according to the disclosure based on the control of the processor 120 have been described above with reference to FIG. 1 to FIG. 7B, redundant descriptions thereof will be omitted.

The camera 130 may be configured to obtain an image on at least one object. Specifically, the camera 130 may include an image sensor, and the image sensor may be configured to convert light entering through the lens as an electric image signal. The camera 130 may include at least one from among the various lenses such as, for example, and without limitation, a telephoto lens, a wide angle lens, a super wide angle lens, a 3D lens, and the like.

Specifically, according to the various embodiments of the disclosure, the processor 120 may be configured to obtain the first image through the camera 130 and store in the memory 110.

The communicator 140 may include circuitry, and may be configured to perform communication with the external device. Specifically, the processor 120 may be configured to receive various data or information from the external device connected through the communicator 140, and transmit various data or information to the external device.

The communicator 140 may include at least one from among a WiFi module, a Bluetooth module, a wireless communication module, and a NFC module. Specifically, the WiFi module and the Bluetooth module may be configured to perform communication in a WiFi method and a Bluetooth method, respectively. When using the WiFi module and the Bluetooth module, various connection information such as SSID may be first transmitted and received, and various information may be transmitted and received after communicatively connecting by using the various connection information.

In addition, the wireless communication module may be configured to perform communication according to the various communication standards such as, for example, and without limitation, IEEE, ZigBee, 3rd Generation (3G), 3rd Generation Partnership Project (3GPP), Long Term Evolution (LTE), 5th Generation (5G), or the like. Further, the NFC module may be configured to perform communication in a near field communication (NFC) method using a 13.56 MHz band from among the various RF-ID frequency bands such as, for example, and without limitation, 135 kHz, 13.56 MHz, 433 MHz, 860-960 MHz, 2.45 GHz, or the like.

Specifically, as illustrated in FIG. 9, the processor 120 may be configured to receive the first image that is the original image from the external device through the communicator 140, and control the communicator 140 to transmit the third image that is the image in which the outer area of the first image is expanded to the external device. In addition, the processor 120 may be configured to receive the first assessment data and the second assessment data according to the disclosure through the communicator 140, and receive various data associated with the neural network model.

The display 150 may be configured to output image data based on the control of the processor 120. Specifically, the display 150 may be configured to output an image pre-stored in the memory 110 based on the control of the processor 120. In addition, the display 150 may be configured to display a user interface (UI) stored in the memory 110. The display 150 may be implemented as a liquid crystal display (LCD) panel, organic light emitting diodes (OLED), and the like, and in some cases, the display 150 may also be implemented as a flexible display, a transparent display, or the like. However, the display 150 according to the disclosure is not limited to a specific type.

Specifically, according to the various embodiments of the disclosure, the processor 120 may be configured to control the display 150 to display images such as, for example, and without limitation, the first image, the second image, the third image, the fourth image, the first segmentation image, the second segmentation image, and the like according to the disclosure. Further, the processor 120 may be configured to control the display 150 to display the UI for providing the expected result on the expansion of the outer area as illustrated in FIG. 7A and FIG. 7B.

Although not illustrated in FIG. 9, the electronic device 100 according to the disclosure may further include a speaker, and based on the image according to the disclosure being a moving image, the display 150 may be controlled to display the moving image and the speaker may be controlled to output audio data corresponding to the moving image simultaneously.

The inputter 160 may include circuitry, and the processor 120 may be configured to receive the user command for controlling an operation of the electronic device 100 through the inputter 160. Specifically, the inputter 160 may be comprised of configurations such as a microphone, a camera 130 (not shown), and a remote control signal receiver (not shown). Further, the inputter 160 may be implemented in a form included in the display 150 as a touch screen. Specifically, the microphone may be configured to receive a voice signal, and convert the received voice signal to an electric signal.

According to the various embodiments of the disclosure, the processor 120 may be configured to receive the user input for expanding the outer area of the first image through the inputter 160, and receive the user input for receiving the assessment information on the result of expanding the outer area.

The controlling method of the electronic device 100 according to the embodiments described above may be implemented using a program and provided to the electronic device 100. Specifically, the program including the controlling method of the electronic device 100 may be stored in a non-transitory computer readable medium and provided.

Specifically, with respect to the non-transitory computer readable medium that includes the program executing the controlling method of the electronic device 100, the controlling method of the electronic device 100 may include identifying, based on receiving the user input for expanding the outer area of the first image, the plurality of objects included in the first image and obtaining the first segmentation image including segmentation information on areas corresponding to the respective objects, obtaining the second segmentation image in which the outer area of the first segmentation image is expanded based on the segmentation information, obtaining the second image in which the segmentation information included in the second segmentation image is converted to RGB information, obtaining the third image by reflecting the feature of the first image to the second image based on the segmentation information, and providing the obtained third image.

In the above, the controlling method of the electronic device 100 and a non-transitory computer readable medium including the program for executing the controlling method of the electronic device 100 have been briefly described, but this is merely to omit redundant descriptions, and the various embodiments on the electronic device 100 may be applied with respect to the controlling method of the electronic device 100, and the non-transitory computer readable medium including the program executing the controlling method of the electronic device 100.

According to the various embodiments of the disclosure as described above, the electronic device 100 according to the disclosure may obtain an image in which the outer area of the original image is naturally expanded and provide to the user based on the types of the respective objects included in the original image and the properties according thereto.

In addition, the electronic device 100 may obtain the first segmentation image in which the boundaries of the respective objects included in the first image are clearly defined by combining the outline detection process to the segmentation process, obtain the second segmentation image in which the boundary of the object is naturally joined by removing the separation line that may appear in the expansion process of the first segmentation image, and obtain the image in which the outer area of the original image is more naturally expanded by performing the image blending process based on the types of the respective objects included in the original image and the properties according thereto.

The electronic device 100 may facilitate user convenience and minimize unnecessary processing processes by providing the user with the expected result on the naturalness of expanding the outer area of the image for the respective original images.

The functions associated with the neural network models as described in the above may be performed through the memory 110 and the processor 120.

The processor 120 may be comprised of one or a plurality of processors 120. The one or plurality of processors 120 may be a generic-purpose processor such as a central processing unit (CPU) and an application processor (AP), a graphics dedicated processor such as a graphic processing unit (GPU) and a vision processing unit (VPU), or an artificial intelligence dedicated processor such as a neural processing unit (NPU).

The one or plurality of processors 120 control input data to be processed according to a pre-defined operation rule or an artificial intelligence model stored in a non-volatile memory 110 and a volatile memory 110. The pre-defined operation rule or artificial intelligence model may be characterized for being created through learning.

Here, the being created through learning may refer to a pre-defined operation rule of a desired feature or an artificial intelligence model being created by applying a learning algorithm to multiple learning data. The learning as described above may be carried out in the device itself in which the artificial intelligence according to the disclosure is performed, or through a separate server/system.

The artificial intelligence model may be comprised of a plurality of neural network layers. The respective layers may include a plurality of weight values, and may perform processing of the layers through processing between the processing results of a previous layer and the plurality of weight values. Examples of the neural network may include Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Deep-Q Networks, or the like, and the neural network of the disclosure is not limited to the above-described examples except for when specified otherwise.

The learning algorithm is a method of having a predetermined target device making determinations or predictions on its own by training the predetermined target device using multiple learning data. Examples of the learning algorithms include supervised learning, unsupervised learning, semi-supervised learning, or reinforcement learning, and the learning algorithm of the disclosure is not limited to the above-described examples unless otherwise specified.

The machine-readable storage medium may be provided in the form of a non-transitory storage medium. Herein, 'non-transitory' merely means that the storage medium is tangible and does not include a signal (e.g., electromagnetic waves), and the term does not differentiate data being semi-permanently stored and data temporarily being stored in the storage medium. For example, the 'non-transitory storage medium' may include a buffer in which data is temporarily stored.

According to an embodiment, a method according to the various embodiments disclosed herein may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be at least stored temporarily in a storage medium such as a server of a manufacturer, a server of an application store, or a memory of a relay server, or temporarily generated.

The respective elements (e.g., a module or a program) according to the various embodiments as described above may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration.

Operations performed by a module, a program, or another element, in accordance with various embodiments, may be performed sequentially, in a parallel, repetitively, or in a heuristically manner, or at least some operations may be performed in a different order, omitted or a different operation may be added.

The terms "part" or "module" used in the disclosure may include a unit configured as a hardware, software, or firmware, and may be used interchangeably with terms such as, for example, and without limitation, logic, logic blocks, parts, circuits, or the like. "Part" or "module" may be a component integrally formed or a minimum unit or a part of the component performing one or more functions. For example, a module may be configured as an application-specific integrated circuit (ASIC).

The various embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to the above-mentioned embodiments.

Based on the instruction being executed by the processor, the processor may directly or using other elements under the control of the processor perform a function corresponding to the instruction. The instructions may include a code generated by a compiler or executed by an interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic device, comprising:
a memory configured to store at least one instruction; and
a processor configured to execute the at least one instruction;
wherein the processor, based on executing the at least one instruction, is configured to:
based on receiving a user input for expanding an outer area of a first image, identify a plurality of objects comprised in the first image and obtain a first segmentation image comprising first segmentation information on areas corresponding to respective objects;
obtain a second segmentation image in which an outer area of the first segmentation image is expanded based on the first segmentation information;
obtain a second image in which second segmentation information comprised in the second segmentation image is converted to RGB information;
obtain a third image by reflecting a feature of the first image to the second image based on the second segmentation information; and
provide the obtained third image.

2. The electronic device of claim 1, wherein the processor is configured to:
obtain information on an outline comprised in the first image;
identify areas of the respective objects comprised in the first image based on information on the outline; and
obtain the first segmentation image by allocating classes of the respective objects according to the first segmentation information to the identified areas of the respective objects.

3. The electronic device of claim 1, wherein the processor is configured to:
identify an expanding property corresponding to types of the respective objects based on information on types of the respective objects comprised in the first segmentation information; and
obtain the second segmentation image by expanding the outer area of the first segmenterion image based on the identified expanding property for the respective objects.

4. The electronic device of claim 1, wherein the processor is configured to:
divide the first segmentation image into a plurality of patches having a pre-set size;
expand a portion of the patches from among the plurality of patches and merge to the outer area of the first segmentation image; and
based on a separation line appearing at a joining surface between the expanded portion of the patches, obtain the second segmentation image by moving a location of an object on both sides of the separation line to a center point of the separation line.

5. The electronic device of claim 1, wherein the processor is configured to:
identify a parameter affecting a style of the first image;
obtain a fourth image based on changing a parameter of the second image to the identified parameter affecting the style of the first image;

identify a blending property corresponding to types of the respective objects based on information on types of the respective objects comprised in the second segmentation information; and obtain the third image by blending the first image and the fourth image based on blending properties of the respective objects.

6. The electronic device of claim 1, wherein:
the processor is configured to:
compare filter information on a plurality of images, stored in the memory, respectively with filter information of images in which an expansion of an outer area is assessed as natural, and
provide assessment information on a naturalness of expanding an outer area expansion of the plurality of images, and
the filter information comprises information on a distribution of RGB values for respective pixels of the respective images and information on a distribution of labels for respective pixels according to segmentation information on the respective images.

7. The electronic device of claim 6, wherein the processor is configured to provide filter information on the third image and the assessment information based on the filter information of images in which the expansion of the outer area is assessed as natural based on receiving a positive feedback from a user on the third image.

8. A controlling method of an electronic device, comprising:
based on receiving a user input for expanding an outer area of a first image, identifying a plurality of objects comprised in the first image and obtaining a first segmentation image comprising first segmentation information on areas corresponding to respective objects;
obtaining a second segmentation image in which the outer area of the first segmentation image is expanded based on the first segmentation information;
obtaining a second image by converting second segmentation information comprised in the second segmentation image to RGB information;
obtaining a third image by reflecting a feature of the first image to the second image based on the second segmentation information; and
providing the obtained third image.

9. The method of claim 8, wherein the obtaining the first segmentation image comprises:
obtaining information on an outline comprised in the first image;
identifying areas of the respective objects comprised in the first image based on information on the outline; and
obtaining the first segmentation image by allocating classes to the respective objects according to the first segmentation information in the identified areas of the respective objects.

10. The method of claim 8, wherein the obtaining the second segmentation image comprises:
identifying an expanding property corresponding to types of the respective objects based on information on types of the respective objects comprised in the first segmentation information; and
obtaining the second segmentation image by expanding the outer area of the first segmentation image based on the identified expanding property for the respective objects.

11. The method of claim 8, wherein the obtaining the second segmentation image comprises:

dividing the first segmentation image into a plurality of patches having a pre-set size;
expanding a portion of the patches from among the plurality of patches and merging to the outer area of the first segmentation image; and
based on a separation line appearing at a joining surface between the expanded portion of the patches, obtaining the second segmentation image by moving a location of an object on both sides of a separation line to a center point of the separation line.

12. The method of claim 8, wherein the obtaining the third image comprises:
identify a parameter affecting a style of the first image;
obtain a fourth image based on changing a parameter of the second image to the identified parameter affecting the style of the first image;
identifying a blending property corresponding to types of the respective objects based on information on types of the respective objects comprised in the second segmentation information; and
obtaining the third image by blending the first image and the fourth image based on blending properties of the respective objects.

13. The method of claim 8, further comprising:
comparing filter information on a plurality of images respectively stored in a memory of the electronic device with filter information of images in which an expansion of an outer area is assessed as natural, and providing assessment information on a naturalness of expanding an outer area expansion of the plurality of images,
wherein the filter information comprises information on a distribution of RGB values for respective pixels of the respective images and information on a distribution of labels for respective pixels according to segmentation information on the respective images.

14. The method of claim 13, wherein the providing the assessment information comprises providing, filter information on the third image and the assessment information based on the filter information of images in which the expansion of the outer area is assessed as natural, based on receiving an input of a positive feedback from a user on the third image.

15. A non-transitory computer readable medium comprising a program executing a controlling method of an electronic device, the method comprising:
based on receiving a user input for expanding an outer area of a first image, identifying a plurality of objects comprised in the first image and obtaining a first segmentation image comprising first segmentation information on areas corresponding to respective objects;
obtaining a second segmentation image in which an outer area of the first segmentation image is expanded based on the first segmentation information;
obtaining a second image by converting second segmentation information comprised in the second segmentation image to RGB information;
obtaining a third image by reflecting a feature of the first image to the second image based on the second segmentation information; and
providing the obtained third image.

16. The non-transitory computer readable medium of claim 15, wherein the obtaining the first segmentation image comprises:
obtaining information on an outline comprised in the first image;

identifying areas of the respective objects comprised in the first image based on information on the outline; and obtaining the first segmentation image by allocating classes to the respective objects according to the first segmentation information in the identified areas of the respective objects.

17. The non-transitory computer readable medium of claim 15, wherein the obtaining the second segmentation image comprises:

identifying an expanding property corresponding to types of the respective objects based on information on types of the respective objects comprised in the first segmentation information; and obtaining the second segmentation image by expanding an outer area of the first segmentation image based on the identified expanding property for the respective objects.

18. The non-transitory computer readable medium of claim 15, wherein the obtaining the second segmentation image comprises:

dividing the first segmentation image into a plurality of patches having a pre-set size;

expanding a portion of the patches from among the plurality of patches and merging to an outer area of the first segmentation image; and based on a separation line appearing at a joining surface between the expanded portion of the patches, obtaining the second segmentation image by moving a location of an object on both sides of a separation line to a center point of the separation line.

* * * * *